(12) United States Patent
Archer et al.

(10) Patent No.: US 7,921,428 B2
(45) Date of Patent: Apr. 5, 2011

(54) MULTI-REGISTRATION OF SOFTWARE LIBRARY RESOURCES

(75) Inventors: Charles J. Archer, Rochester, MN (US); Michael A. Blocksome, Rochester, MN (US); Joseph D. Ratterman, Rochester, MN (US); Brian E. Smith, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 960 days.

(21) Appl. No.: 11/764,302

(22) Filed: Jun. 18, 2007

(65) Prior Publication Data

US 2008/0313341 A1 Dec. 18, 2008

(51) Int. Cl.
*G06F 15/163* (2006.01)
(52) U.S. Cl. ............................... 719/313; 719/328
(58) Field of Classification Search ................ None
See application file for complete search history.

(56) References Cited

U.S. PATENT DOCUMENTS

| | | | |
|---|---|---|---|
| 5,050,162 A | 9/1991 | Golestani | |
| 5,617,537 A | 4/1997 | Yamada et al. | |
| 5,680,116 A | 10/1997 | Hashimoto et al. | |
| 5,790,530 A | 8/1998 | Moh et al. | |
| 6,072,781 A | 6/2000 | Feeney et al. | |
| 6,105,122 A | 8/2000 | Muller et al. | |
| 7,120,916 B1 * | 10/2006 | Firth et al. | 719/328 |
| 7,155,541 B2 | 12/2006 | Ganapathy et al. | |
| 2003/0233497 A1 | 12/2003 | Shih | |
| 2005/0114561 A1 | 5/2005 | Lu et al. | |
| 2005/0198113 A1 | 9/2005 | Mohamed et al. | |
| 2006/0045005 A1 | 3/2006 | Blackmore et al. | |
| 2006/0045109 A1 | 3/2006 | Blackmore et al. | |
| 2006/0047771 A1 | 3/2006 | Blackmore et al. | |
| 2006/0056405 A1 | 3/2006 | Chang et al. | |
| 2006/0075057 A1 | 4/2006 | Gildea et al. | |
| 2006/0206635 A1 | 9/2006 | Alexander et al. | |
| 2006/0253619 A1 | 11/2006 | Torudbakken et al. | |
| 2008/0109573 A1 | 5/2008 | Leonard et al. | |
| 2008/0222317 A1 | 9/2008 | Go et al. | |

OTHER PUBLICATIONS

Almasi et al., "MPI on BlueGene/L: Designing an Efficient General Purpose Messaging Solution for a Large Cellular System," Presented at the 10th European PVM/MPI Users' Group Conference, Venice, Italy (Sep. 29-Oct. 2, 2003) [retrieved from http://www.cs.uiuc.edu/homes/wgropp/bib/papers/2003/rc22851-ibm-bgl.pdf on Jul. 9, 2010].*

(Continued)

*Primary Examiner* — Hyung S Sough
*Assistant Examiner* — Brian Wathen
(74) *Attorney, Agent, or Firm* — Matthew C. Zehrer

(57) ABSTRACT

Data communications, including issuing, by an application program to a high level data communications library, a request for initialization of a data communications service; issuing to a low level data communications library a request for registration of data communications functions; registering the data communications functions, including instantiating a factory object for each of the one or more data communications functions; issuing by the application program an instruction to execute a designated data communications function; issuing, to the low level data communications library, an instruction to execute the designated data communications function, including passing to the low level data communications library a call parameter that identifies a factory object; creating with the identified factory object the data communications object that implements the data communications function according to the protocol; and executing by the low level data communications library the designated data communications function.

15 Claims, 9 Drawing Sheets

OTHER PUBLICATIONS

Almasi et al., "Architecture and Performance of the BlueGene/L Message Layer," Proceedings fo the 11th European PVM/MPI Users' Group Meeting, EuroPVM/MPI 2004, LNCS 3241, pp. 405-414, 2004.*
Pritchard, J. COM and CORBA Side by Side: Architectures, Strategies, and Implementations. Addison-Wesley (Jul. 1999) pp. 74-84.*
Zukowski, J. Mastering Java 1.2. Sybex (1998), pp. 900-903.*
Fink, T., "Integrating MPI Components into Metacomputing Applications" 7th European PVM/MPI Users' Group Meeting, EuroPVM/MPI 2000, LNCS 1908, pp. 208-215, 2000.*
Watson, Robert, "DMA Controller Programming in C," C Users Journal, v11n11, Nov. 1993, p. 35-50.
Office Action Dated May 26, 2009 in U.S. Appl. No. 11/829,325.
U.S. Appl. No. 11/776,707, filed Jul. 12, 2007, Blocksome.
U.S. Appl. No. 11/739,948, filed Apr. 25, 2007, Blocksome et al.
U.S. Appl. No. 11/740,361, filed Apr. 26, 2007, Archer et al.
U.S. Appl. No. 11/746,333, filed May 9, 2007, Archer et al.
U.S. Appl. No. 11/754,765, filed May 29, 2007, Archer et al.
U.S. Appl. No. 11/764,302, filed Jun. 18, 2007, Archer et al.
U.S. Appl. No. 11/755,501, filed May 30, 2007, Archer et al.
U.S. Appl. No. 11/829,325, filed Jul. 27, 2007, Archer et al.
U.S. Appl. No. 11/829,334, filed Jul. 27, 2007, Archer et al.
U.S. Appl. No. 11/776,718, filed Jul. 12, 2007, Blocksome.
U.S. Appl. No. 11/829,339, filed Jul. 27, 2007, Blocksome.
Office Action Dated Aug. 27, 2009 in U.S. Appl. No. 11/739,948.
Office Action Dated Sep. 1, 2009 in U.S. Appl. No. 11/776,718.
Office Action Dated Sep. 18, 2009 in U.S. Appl. No. 11/829,334.
Office Action Dated Sep. 15, 2009 in U.S. Appl. No. 11/829,339.
Office Action Dated Nov. 24, 2009 in U.S. Appl. No. 11/829,325.
Office Action Dated Apr. 1, 2010 in U.S. Appl. No. 11/739,948.
Office Action Dated Feb. 5, 2010 in U.S. Appl. No. 11/746,333.
Office Action Dated Apr. 1, 2010 in U.S. Appl. No. 11/829,339.
Final Office Action Dated Mar. 8, 2010 in U.S. Appl. No. 11/829,334.
Final Office Action Dated Feb. 23, 2010 in U.S. Appl. No. 11/776,718.

* cited by examiner

MULTI-REGISTRATION OF SOFTWARE LIBRARY RESOURCES

STATEMENT REGARDING FEDERALLY SPONSORED RESEARCH OR DEVELOPMENT

This invention was made with Government support under Contract No. B554331 awarded by the Department of Energy. The Government has certain rights in this invention.

BACKGROUND OF THE INVENTION

1. Field of the Invention

The field of the invention is data processing, or, more specifically, methods, apparatus, and products for data communications.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Parallel computing is an area of computer technology that has experienced advances. Parallel computing is the simultaneous execution of the same task (split up and specially adapted) on multiple processors in order to obtain results faster. Parallel computing is based on the fact that the process of solving a problem usually can be divided into smaller tasks, which may be carried out simultaneously with some coordination.

Parallel computers execute parallel algorithms. A parallel algorithm can be split up to be executed a piece at a time on many different processing devices, and then put back together again at the end to get a data processing result. Some algorithms are easy to divide up into pieces. Splitting up the job of checking all of the numbers from one to a hundred thousand to see which are primes could be done, for example, by assigning a subset of the numbers to each available processor, and then putting the list of positive results back together. In this specification, the multiple processing devices that execute the individual pieces of a parallel program are referred to as 'compute nodes.' A parallel computer is composed of compute nodes and other processing nodes as well, including, for example, input/output ('I/O') nodes, and service nodes.

Parallel algorithms are valuable because it is faster to perform some kinds of large computing tasks via a parallel algorithm than it is via a serial (non-parallel) algorithm, because of the way modern processors work. It is far more difficult to construct a computer with a single fast processor than one with many slow processors with the same throughput. There are also certain theoretical limits to the potential speed of serial processors. On the other hand, every parallel algorithm has a serial part and so parallel algorithms have a saturation point. After that point adding more processors does not yield any more throughput but only increases the overhead and cost.

Parallel algorithms are designed also to optimize one more resource the data communications requirements among the nodes of a parallel computer. There are two ways parallel processors communicate, shared memory or message passing. Shared memory processing needs additional locking for the data and imposes the overhead of additional processor and bus cycles and also serializes some portion of the algorithm.

Message passing processing uses high-speed data communications networks and message buffers, but this communication adds transfer overhead on the data communications networks as well as additional memory need for message buffers and latency in the data communications among nodes. Designs of parallel computers use specially designed data communications links so that the communication overhead will be small but it is the parallel algorithm that decides the volume of the traffic.

Many data communications network architectures are used for message passing among nodes in parallel computers. Compute nodes may be organized in a network as a 'torus' or 'mesh,' for example. Also, compute nodes may be organized in a network as a tree. A torus network connects the nodes in a three-dimensional mesh with wrap around links. Every node is connected to its six neighbors through this torus network, and each node is addressed by its x, y, z coordinate in the mesh. In a tree network, the nodes typically are connected into a binary tree: each node has a parent, and two children (although some nodes may only have zero children or one child, depending on the hardware configuration). In computers that use a torus and a tree network, the two networks typically are implemented independently of one another, with separate routing circuits, separate physical links, and separate message buffers.

A torus network lends itself to point to point operations, but a tree network typically is inefficient in point to point communication. A tree network, however, does provide high bandwidth and low latency for certain collective operations, message passing operations where all compute nodes participate simultaneously, such as, for example, an allgather. An allgather operation is a collective operation on an operational group of compute nodes that gathers data from all compute nodes in the operational group, concatenates the gathered data into a memory buffer in rank order, and provides the entire contents of the memory buffer to all compute nodes in the operational group. Because thousands of nodes may participate in collective operations on a parallel computer, data communications among compute nodes is always a challenge.

Modern computer systems, especially massively parallel computers, implement many protocols and export these protocols to many high libraries which must coexist. Software libraries, such as the Blue Gene Message Layer (BGML) library, specify an Application Program Interface ('API') which is used by the client application and is implemented by the software library. Communications interfaces typically require configuration information to be specified before the a communications function may be called. This information is used in each invocation of communications function to complete communications tasks. This is acceptable in an environment where only a single application or higher-level software library will access a low-level software library.

In a more complex software stack, however, where an application may concurrently use multiple high-level software libraries (such as MPI and ARMCI) which access the low-level software library this software design is insufficient. The high-level software libraries will specify alternate configurations with the result being that only the last high-level software library to configure the low-level software library will have its configuration honored. All other high-level software libraries will have their configuration(s) ignored.

A solution to this problem of concurrent access by higher-level software libraries is to provide additional APIs for each library. For example, the BGML functions might be changed from:

```
            BGML_Send_configure (...)
            BGML_Send (...)
        to:
            BGML_MPI_Send_configure (...)
            BGML_ARMCI_Send_configure (...)
            BGML_MPI_Send (...)
            BGML_ARMCI_Send (...)
```

This solution is not scalable, not general, and not feasible. A better solution is needed to allow for concurrent access to the low-level software library by multiple high-level software libraries.

Often there are multiple ways the low-level software library may choose to implement its API. Some implementations may perform better than other implementations in various computation/communication environments. The high-level software libraries need access to these different low-level implementations in order to achieve the best performance. The known solution to this problem is similar to the known solution described above. For example, the BGML functions might be changed from:

```
            BGML_Send_configure (...)
            BGML_Send (...)
        to:
            BGML_Send_configure (...)
            BGML_Send_small_message (...)
            BGML_Send_large_message (...)
```

Again, this solution is not scalable, not general, and not feasible. A better solution is needed to allow for high-level software libraries to access low-level software library API implementation optimizations.

SUMMARY OF THE INVENTION

Methods, apparatus, and computer program products are disclosed for data communications, including issuing, by at least one application program to a high level data communications library, at least one request for initialization of a data communications service for the application program; responsive to receiving the request for initialization, issuing, by the high level data communications library to a low level data communications library, at least one request for registration of one or more data communications functions for the high level data communications library in a data communications protocol; responsive to receiving the at least one request for registration, registering, by the low level data communication library, the one or more data communications functions for the high level data communications library in a data communications protocol, including instantiating by the low level data communication library a factory object for each of the one or more data communications functions, each factory object capable of creating a communications object that implements a corresponding data communications function according to the protocol; issuing, by the application program to the high level data communications library, an instruction to execute a designated one of the data communications functions; responsive to receiving the instruction from the application program, issuing, by the high level data communications library to the low level data communications library, an instruction to execute the designated data communications function, including passing to the low level data communications library a call parameter that identifies the factory object capable of creating a data communications object that implements the designated data communications function according to the protocol; responsive to receiving the instruction from the high level data communication library, creating, by the low level data communications library with the identified factory object, the data communications object that implements the data communications function according to the protocol; and executing by the low level data communications library the designated data communications function through the data communication object that implements the data communications function according to the protocol.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
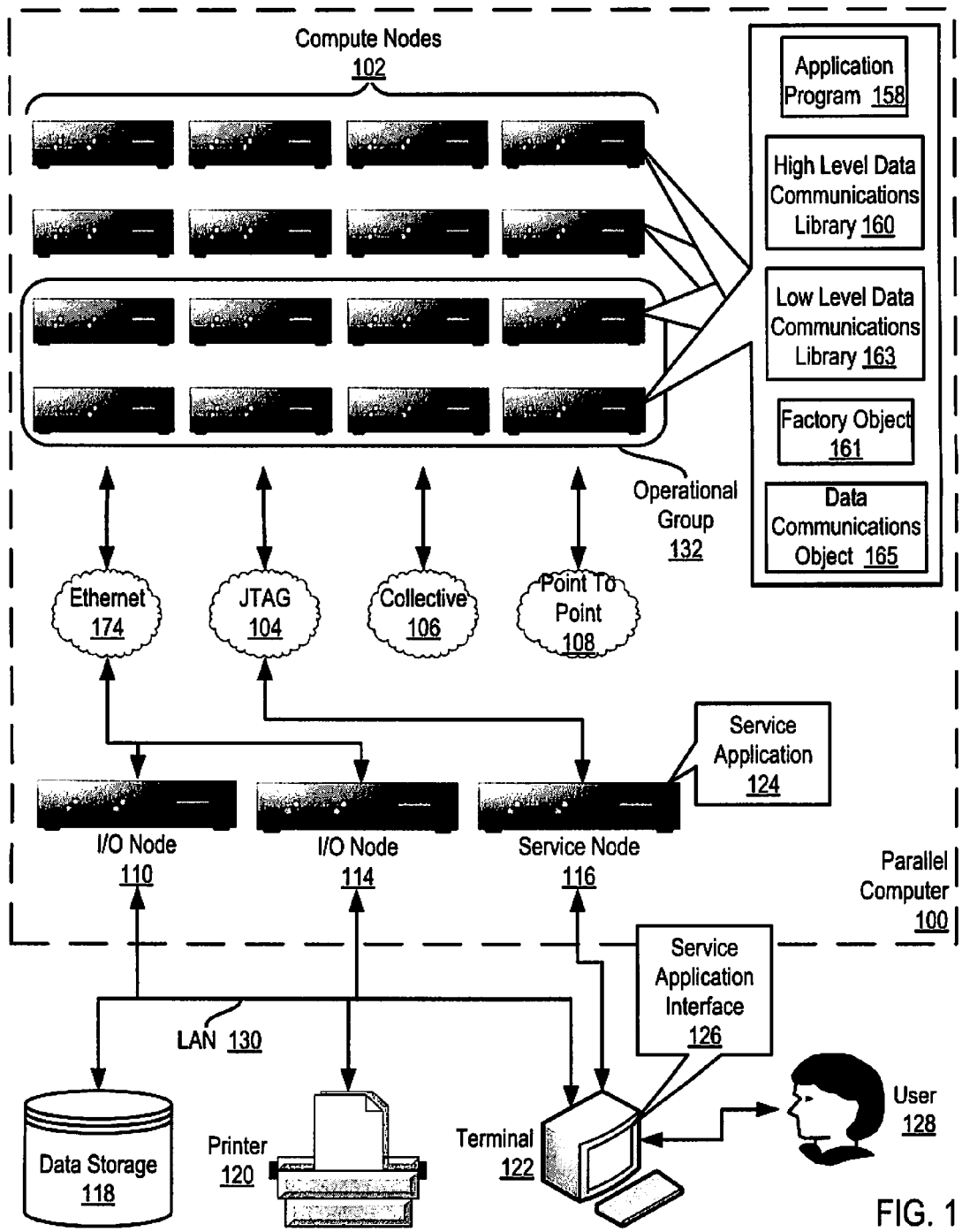
FIG. 1 illustrates an exemplary system for computer data communications according to embodiments of the present invention.

Exemplary methods, apparatus, and computer program products for data communications according to embodiments of the present invention are described with reference to the accompanying drawings, beginning with FIG. 1. FIG. 1 illustrates an exemplary system for data communications according to embodiments of the present invention. The system of FIG. 1 includes a parallel computer (100), non-volatile memory for the computer in the form of data storage device (118), an output device for the computer in the form of printer (120), and an input/output device for the computer in the form of computer terminal (122). Parallel computer (100) in the example of FIG. 1 includes a plurality of compute nodes (102).

The compute nodes (102) are coupled for data communications by several independent data communications networks including a high speed Ethernet network (174), a Joint Test Action Group ('JTAG') network (104), a tree network (106) which is optimized for collective operations, and a torus network (108) which is optimized point to point operations. Tree network (106) is a data communications network that includes data communications links connected to the compute nodes so as to organize the compute nodes as a tree. Each data communications network is implemented with data communications links among the compute nodes (102). The data communications links provide data communications for parallel operations among the compute nodes of the parallel computer.

In addition, the compute nodes (102) of parallel computer are organized into at least one operational group (132) of compute nodes for collective parallel operations on parallel computer (100). An operational group of compute nodes is the set of compute nodes upon which a collective parallel operation executes. Collective operations are implemented with data communications among the compute nodes of an operational group. Collective operations are those functions that involve all the compute nodes of an operational group. A collective operation is an operation, a message-passing computer program instruction that is executed simultaneously, that is, at approximately the same time, by all the compute nodes in an operational group of compute nodes. Such an operational group may include all the compute nodes in a parallel computer (100) or a subset all the compute nodes. Collective operations are often built around point to point operations. A collective operation requires that all processes on all compute nodes within an operational group call the same collective operation with matching arguments. A 'broadcast' is an example of a collective operations for moving data among compute nodes of an operational group. A 'reduce' operation is an example of a collective operation that executes arithmetic or logical functions on data distributed among the compute nodes of an operational group. An operational group may be implemented as, for example, an MPI 'communicator.'

'MPI' refers to 'Message Passing Interface,' a prior art high level data communications library, a module of computer program instructions for data communications on parallel computers. Examples of prior-art data communications libraries that may be improved for data communications according to embodiments of the present invention include MPI, the 'Parallel Virtual Machine' ('PVM') library, the Aggregate Remote Memory Copy Interface ('ARMCI') library, and the TCGMSG library. PVM was developed by the University of Tennessee, The Oak Ridge National Laboratory, and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention. ARMCI is a product of the U.S. Department of Energy's Pacific Northwest National Laboratory, and TCGMSG is public domain software available from the U.S. Department of Energy's Argonne National Laboratory.

Most collective operations are variations or combinations of four basic operations: broadcast, gather, scatter, and reduce. In a broadcast operation, all processes specify the same root process, whose buffer contents will be sent. Processes other than the root specify receive buffers. After the operation, all buffers contain the message from the root process.

A scatter operation, like the broadcast operation, is also a one-to-many collective operation. All processes specify the same receive count. The send arguments are only significant to the root process, whose buffer actually contains sendcount*N elements of a given datatype, where N is the number of processes in the given group of compute nodes. The send buffer will be divided equally and dispersed to all processes (including itself). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked compute nodes into a receive buffer in a root node.

A reduce operation is also a many-to-one collective operation that includes an arithmetic or logical function performed on two data elements. All processes specify the same 'count' and the same arithmetic or logical function. After the reduction, all processes have sent count data elements from computer node send buffers to the root process. In a reduction operation, data elements from corresponding send buffer locations are combined pair-wise by arithmetic or logical operations to yield a single corresponding element in the root process's receive buffer. Application specific reduction operations can be defined at runtime. High level data communications libraries may support predefined operations. MPI, for example, provides the following pre-defined reduction operations:

| | |
|---|---|
| MPI_MAX | maximum |
| MPI_MIN | minimum |
| MPI_SUM | sum |
| MPI_PROD | product |
| MPI_LAND | logical and |
| MPI_BAND | bitwise and |
| MPI_LOR | logical or |
| MPI_BOR | bitwise or |
| MPI_LXOR | logical exclusive or |
| MPI_BXOR | bitwise exclusive or |

In addition to compute nodes, computer (100) includes input/output ('I/O') nodes (110, 114) coupled to compute nodes (102) through one of the data communications networks (174). The I/O nodes (110, 114) provide I/O services between compute nodes (102) and I/O devices (118, 120, 122). I/O nodes (110, 114) are connected for data communications I/O devices (118, 120, 122) through local area network ('LAN') (130). Computer (100) also includes a service node (116) coupled to the compute nodes through one of the networks (104). Service node (116) provides service common to pluralities of compute nodes, loading programs into the compute nodes, starting program execution on the compute nodes, retrieving results of program operations on the computer nodes, and so on. Service node (116) runs a service application (124) and communicates with users (128) through a service application interface (126) that runs on computer terminal (122).

The arrangement of nodes, networks, and I/O devices making up the exemplary system illustrated in FIG. 1 are for explanation only, not for limitation of the present invention. Data processing systems capable of data communications according to embodiments of the present invention may include additional nodes, networks, devices, and architectures, not shown in FIG. 1, as will occur to those of skill in the art. The parallel computer (100) in the example of FIG. 1 includes sixteen compute nodes (102); parallel computers capable of data communications according to embodiments of the present invention sometimes include thousands of compute nodes. In addition to Ethernet and JTAG, networks in such data processing systems may support many data communications protocols including for example TCP (Transmission Control Protocol), IP (Internet Protocol), and others as will occur to those of skill in the art. Various embodiments of the present invention may be implemented on a variety of hardware platforms in addition to those illustrated in FIG. 1.

Installed on any or all of the compute nodes of the parallel computer in the example of FIG. 1 are an application program (158), a high level data communications library (160), a low level data communications library (163), a factory object (161), and a data communications object (165). The application program (158) is a module of computer program instructions that carries out parallel, user-level data processing using parallel algorithms. The high level data communications library (160) is a library of computer program instructions that carry out data communications among compute nodes, including point to point operations as well as collective operations. The low level data communications library (163) is a library of computer program instructions that operate data communications protocols to carry out actual communications of computer data among computers or compute nodes. The data communications object (165) is an instance of a data communications class that effects a particular data communications function in accordance with a particular data communications protocol, such as, for example, a transmit function or a receive function. The factory object (161) is an instance of a factory class that creates a data communications object to carry out a particular data communications function according to a particular data communications protocol.

The parallel computer of FIG. 1 operates generally to carry out data communications according to embodiments of the present invention as follows: The application program (158) issues to the high level data communications library (160) a request for initialization of a data communications service for the application program. Such a request for initialization may, for example, be a request to establish a connection for data communications between two of the compute nodes. In response to the request for initialization, the high level data communications library issues to the low level data communications library a request for registration of one or more data communications functions for the high level data communications library in a data communications protocol. Such data communications functions may include functions that open a connection, listen on the connection for data, transmit data through the connection, receive data through the connection, close the connection, and so on. In response to a request for registration, the low level data communication library registers the data communications functions for the high level data communications library protocol. As part of the registration, the low level data communication library instantiates a factory object for each of the data communications functions. Each such factory object is capable of creating a communications object that implements one of the data communications functions.

Having initialized a data communications service in the high level data communication library, the application program (158) issues to the high level data communications library (160) an instruction to execute a designated data communications function. In response to the instruction from the application program, the high level data communications library (160) issues to the low level data communications library (163) an instruction to execute the designated data communications function, including passing to the low level data communications library a call parameter that identifies the factory object (161) capable of creating a data communications object (162) that implements the designated data communications function according to the protocol. In response to the instruction from the high level data communication library (160), the low level data communications library (163) creates, with the identified factory object (161), the data communications object (162) that implements the data communications function according to the protocol. The low level data communications library then executes the designated data communications function through the newly created data communication object (165). Depending on the implementation, both the factory object (161) and the data communications object (165), or either of them, may be stored in computer memory, typically random access memory, allocated to either the high level data communications library (160) or the low level data communications library (163). In addition, when a factory object (161) or a data communications object (165) is stored in RAM allocated to the high level data communications library (160), such utilization of RAM allocated to the high level data communications library may be opaque from the point of view of the high level data communications library.

Data communications according to embodiments of the present invention is generally implemented on a parallel computer that includes a plurality of compute nodes. In fact, such computers may include thousands of such compute nodes. Each compute node is in turn itself a kind of computer composed of one or more computer processors, its own computer memory, and its own input/output adapters. For further explanation, therefore, FIG. 2 sets forth a block diagram of an exemplary compute node useful in a parallel computer capable of data communications according to embodiments of the present invention. The compute node (152) of FIG. 2 includes at least one computer processor (164) as well as random access memory ('RAM') (156). Processor (164) is connected to RAM (156) through a high-speed memory bus (154) and through a bus adapter (194) and a extension bus (168) to other components of the compute node. Stored in RAM (156) is an application program (158), a module of computer program instructions that carries out parallel, user-level data processing using parallel algorithms.

Also stored in RAM (156) are a high level data communications library (160), a low level data communications library (163), a factory object (161), and a data communications object (165). The high level data communications library (160) in this example is a library of computer program instructions that carry out data communications among compute nodes, including point to point operations as well as collective operations. The low level data communications library (163) is a library of computer program instructions that carry out actual data communications functions among compute nodes or other computers connected to compute node (152) through one or more data communications networks. Application program (158) executes collective operations by calling software functions in the high level data communications library (160), and the high level data communications library (160) in turn carries out its low level data communications operations by calls to data communications functions in the low level data communications library (163). A library of data communications functions may be developed from scratch for use in data communications according to embodiments of the present invention, using a traditional programming language such as the C programming language, and using traditional programming methods to write data communications functions that send and receive data among nodes on two independent data communications networks. Alternatively, existing prior art libraries may be used. Examples of prior-art high level data communications libraries that may be improved for data communications according to embodiments of the present invention include the 'Message Passing Interface' ('MPI') library, the 'Parallel Virtual Machine' ('PVM') library, the Aggregate Remote Memory Copy Interface ('ARMCI') library, and the TCGMSG library. An example of a low level data communications library that may be improved for data communications according to embodiments of the present invention is IBM's BlueGene Message Layer ('BGML'). The data communications object (165) is an instance of a data communications class that effects a particular data communications function in accordance with a particular data communications protocol, such as, for example, a transmit function or a receive function. The factory object (161) is an instance of a factory class that creates a data communications object to carry out a particular data communications function according to a particular data communications protocol.

Figure 2:
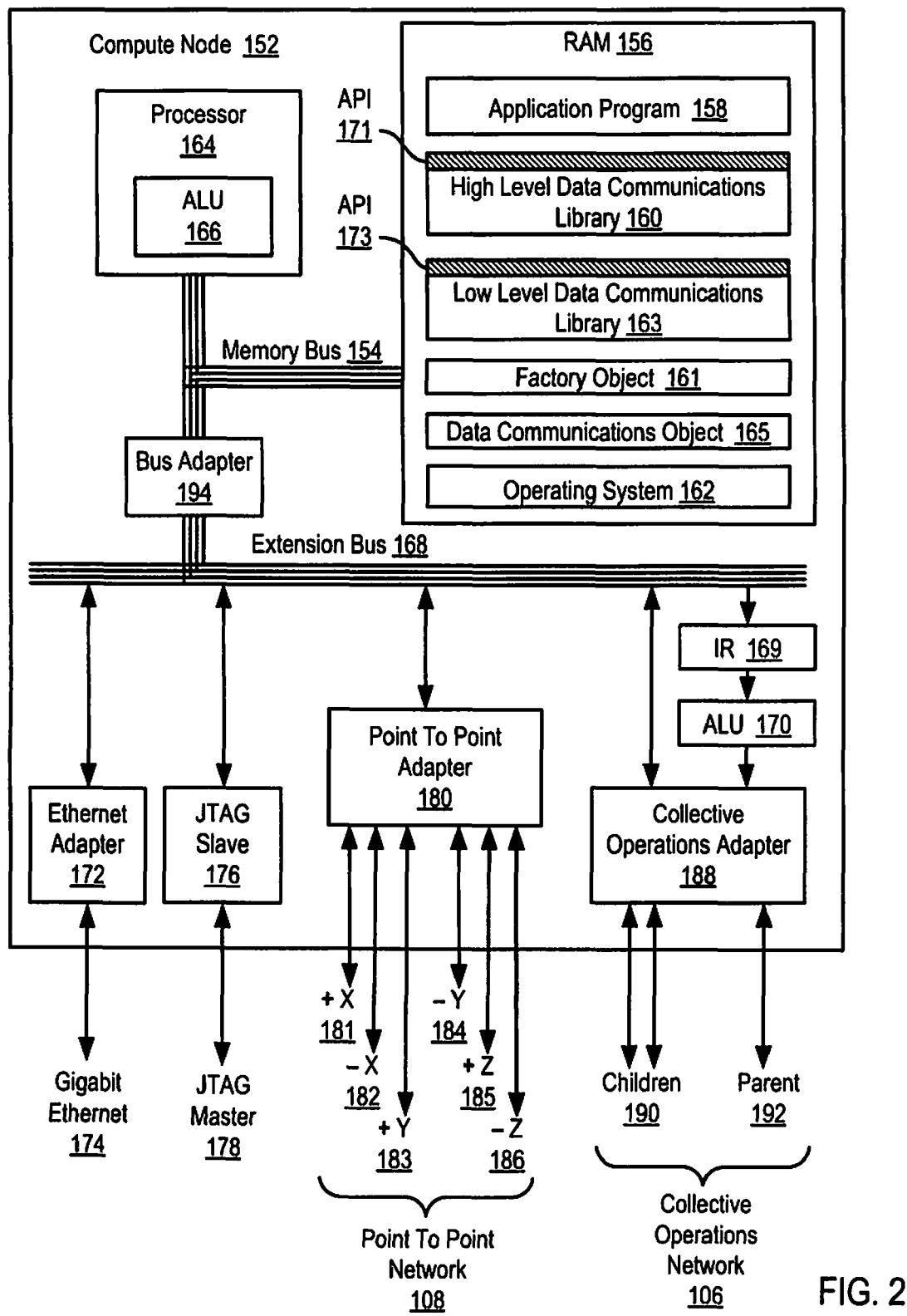
FIG. 2 sets forth a block diagram of an exemplary compute node useful in data communications according to embodiments of the present invention.

The high level data communications library (160) and the low level data communications library (163) in the example of FIG. 2 are improved to carry out data communications according to embodiments of the present invention as follows: The application program (158) issues to the high level data communications library (160) a request for initialization of a data communications service for the application program. Such a request for initialization typically is issued through an application programming interface ('API') (171) exposed for the purpose by the high level data communication library (160) and may, for example, be a request to establish a connection for data communications between two of the compute nodes. In response to the request for initialization, the high level data communications library issues to the low level data communications library a request for registration of one or more data communications functions for the high level data communications library in a data communications protocol. The request for registration of data communications functions may be issued through an API (173) exposed by the low level data communications library (163), and such data communications functions may include functions that open a connection, listen on the connection for data, transmit data through the connection, receive data through the connection, close the connection, and so on. In response to a request for registration, the low level data communication library (163) registers the data communications functions for the high level data communications library protocol. As part of the registration, the low level data communication library instantiates a factory object (161) for each of the data communications functions. Each such factory object is capable of creating a communications object (162) that implements one of the data communications functions.

Having initialized a data communications service in the high level data communication library, the application program (158) issues to the high level data communications library (160) an instruction to execute a designated data communications function. In response to the instruction from the application program, the high level data communications library (160) issues to the low level data communications library (163) an instruction to execute the designated data communications function, including passing to the low level data communications library a call parameter that identifies the factory object (161) capable of creating a data communications object (162) that implements the designated data communications function according to the protocol. In response to the instruction from the high level data communication library (160), the low level data communications library (163) creates, with the identified factory object (161), the data communications object (162) that implements the data communications function according to the protocol. The low level data communications library then executes the designated data communications function through the newly created data communication object (165). Depending on the implementation, both the factory object (161) and the data communications object (165), or either of them, may be stored in RAM (156) allocated to either the high level data communications library (160) or the low level data communications library (163). In addition, when a factory object (161) or a data communications object (165) is stored in RAM allocated to the high level data communications library (160), such utilization of RAM allocated to the high level data communications library may be opaque from the point of view of the high level data communications library.

Also stored in RAM (156) is an operating system (162), a module of computer program instructions and routines for an application program's access to other resources of the compute node. It is typical for an application program and data communications libraries in a compute node of a parallel computer to run a single thread of execution with no user login and no security issues because the thread is entitled to complete access to all resources of the node. The quantity and complexity of tasks to be performed by an operating system on a compute node in a parallel computer therefore are smaller and less complex than those of an operating system on a serial computer with many threads running simultaneously. In addition, there is no video I/O on the compute node (152) of FIG. 2, another factor that decreases the demands on the operating system. The operating system may therefore be quite lightweight by comparison with operating systems of general purpose computers, a pared down version as it were, or an operating system developed specifically for operations on a particular parallel computer. Operating systems that may usefully be improved for such use in a compute node include UNIX™, Linux™, Microsoft XP™, AIX™, IBM's i5/OS™, and others that will occur to those of skill in the art.

The exemplary compute node (152) of FIG. 2 includes several communications adapters (172, 176, 180, 188) for implementing data communications with other nodes of a parallel computer. Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful in systems that carry out data communications according to embodiments of the present invention include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (152) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 includes a JTAG Slave circuit (176) that couples example compute node (152) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient "back door" into the system. The example compute node of FIG. 2 may be all three of these: It typically includes one or more integrated circuits installed on a printed circuit board and may be implemented as an embedded system having its own processor, its own memory, and its own I/O capability. JTAG boundary scans through JTAG Slave (176) may efficiently configure processor registers and memory in compute node (152) for use in data communications according to embodiments of the present invention.

The data communications adapters in the example of FIG. 2 includes a Point To Point Adapter (180) that couples example compute node (152) for data communications to a network (108) that is optimal for point to point message passing operations such as, for example, a network configured as a three-dimensional torus or mesh. Point To Point Adapter (180) provides data communications in six directions on three communications axes, x, y, and z, through six bidirectional links: +x (181), −x (182), +y (183), −y (184), +z (185), and −z (186).

The data communications adapters in the example of FIG. 2 includes a Collective Operations Adapter (188) that couples example compute node (152) for data communications to a network (106) that is optimal for collective message passing operations such as, for example, a network configured as a binary tree. Collective Operations Adapter (188) provides data communications through three bidirectional links: two to children nodes (190) and one to a parent node (192).

Example compute node (152) includes two arithmetic logic units ('ALUs'). ALU (166) is a component of processor (164), and a separate ALU (170) is dedicated to the exclusive use of collective operations adapter (188) for use in performing the arithmetic and logical functions of reduction operations. Computer program instructions of a reduction routine in high level data communications library (160) may latch an instruction for an arithmetic or logical function into instruction register (169). When the arithmetic or logical function of a reduction operation is a 'sum' or a 'logical or,' for example, collective operations adapter (188) may execute the arithmetic or logical operation by use of ALU (166) in processor (164) or, typically much faster, by use dedicated ALU (170).

Figure 3A:
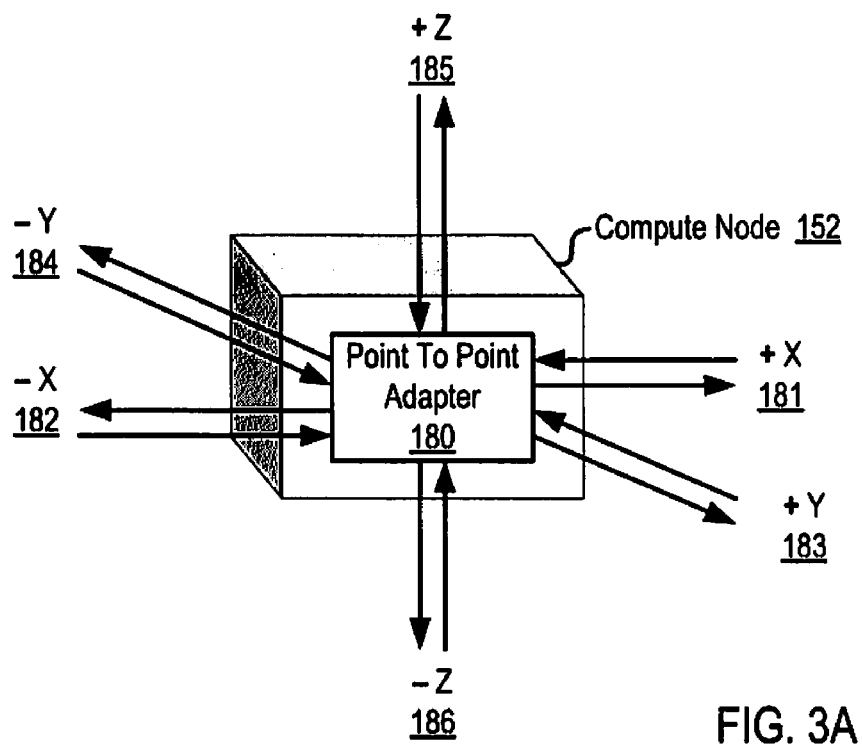
FIG. 3A illustrates an exemplary Point To Point Adapter useful in systems that carry out data communications according to embodiments of the present invention.

For further explanation, FIG. 3A illustrates an exemplary Point To Point Adapter (180) useful in systems that carry out data communications according to embodiments of the present invention. Point To Point Adapter (180) is designed for use in a data communications network optimized for point to point operations, a network that organizes compute nodes in a three-dimensional torus or mesh. Point To Point Adapter (180) in the example of FIG. 3A provides data communication along an x-axis through four unidirectional data communications links, to and from the next node in the −x direction (182) and to and from the next node in the +x direction (181). Point To Point Adapter (180) also provides data communication along a y-axis through four unidirectional data communications links, to and from the next node in the −y direction (184) and to and from the next node in the +y direction (183). Point To Point Adapter (180) in also provides data communication along a z-axis through four unidirectional data communications links, to and from the next node in the −z direction (186) and to and from the next node in the +z direction (185).

Figure 3B:
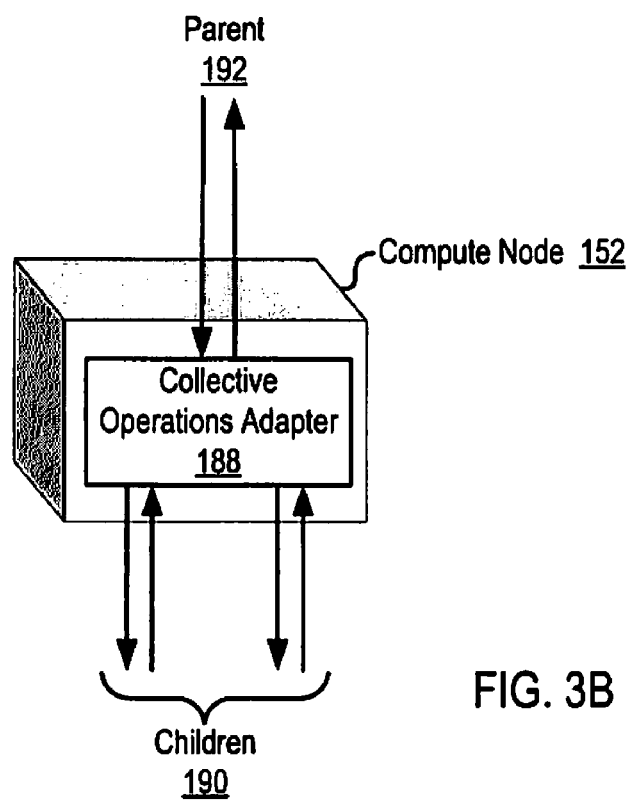
FIG. 3B illustrates an exemplary Collective Operations Adapter useful in systems that carry out data communications according to embodiments of the present invention.

For further explanation, FIG. 3B illustrates an exemplary Collective Operations Adapter (188) useful in systems that carry out data communications according to embodiments of the present invention. Collective Operations Adapter (188) is designed for use in a network optimized for collective operations, a network that organizes compute nodes of a parallel computer in a binary tree. Collective Operations Adapter (188) in the example of FIG. 3B provides data communication to and from two children nodes through four unidirectional data communications links (190). Collective Operations Adapter (188) also provides data communication to and from a parent node through two unidirectional data communications links (192).

Figure 4:
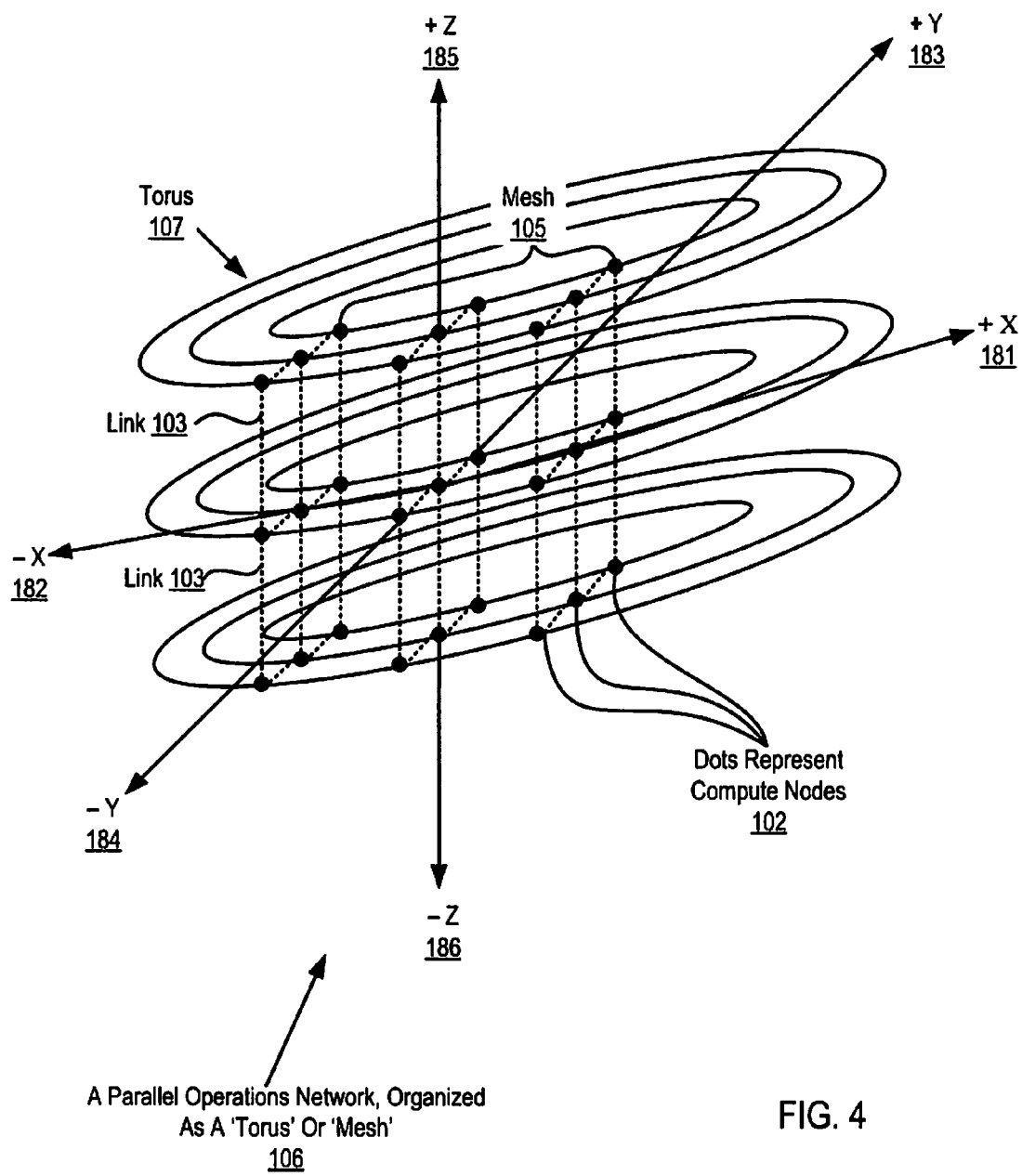
FIG. 4 illustrates an exemplary data communications network optimized for point to point operations.

For further explanation, FIG. 4 illustrates an exemplary data communications network optimized for point to point operations (106). In the example of FIG. 4, dots represent compute nodes (102) of a parallel computer, and the dotted lines between the dots represent data communications links (103) between compute nodes. The data communications links are implemented with point to point data communications adapters similar to the one illustrated for example in FIG. 3A, with data communications links on three axes, x, y, and z, and to and fro in six directions +x (181), −x (182), +y (183), −y (184), +z (185), and −z (186). The links and compute nodes are organized by this data communications network optimized for point to point operations into a three dimensional mesh (105) that wraps around to form a torus (107). Each compute node in the torus has a location in the torus that is uniquely specified by a set of x, y, z coordinates. For clarity of explanation, the data communications network of FIG. 4 is illustrated with only 27 compute nodes, but readers will recognize that a data communications network optimized for point to point operations for use in data communications on accordance with embodiments of the present invention may contain only a few compute nodes or may contain thousands of compute nodes.

Figure 5:
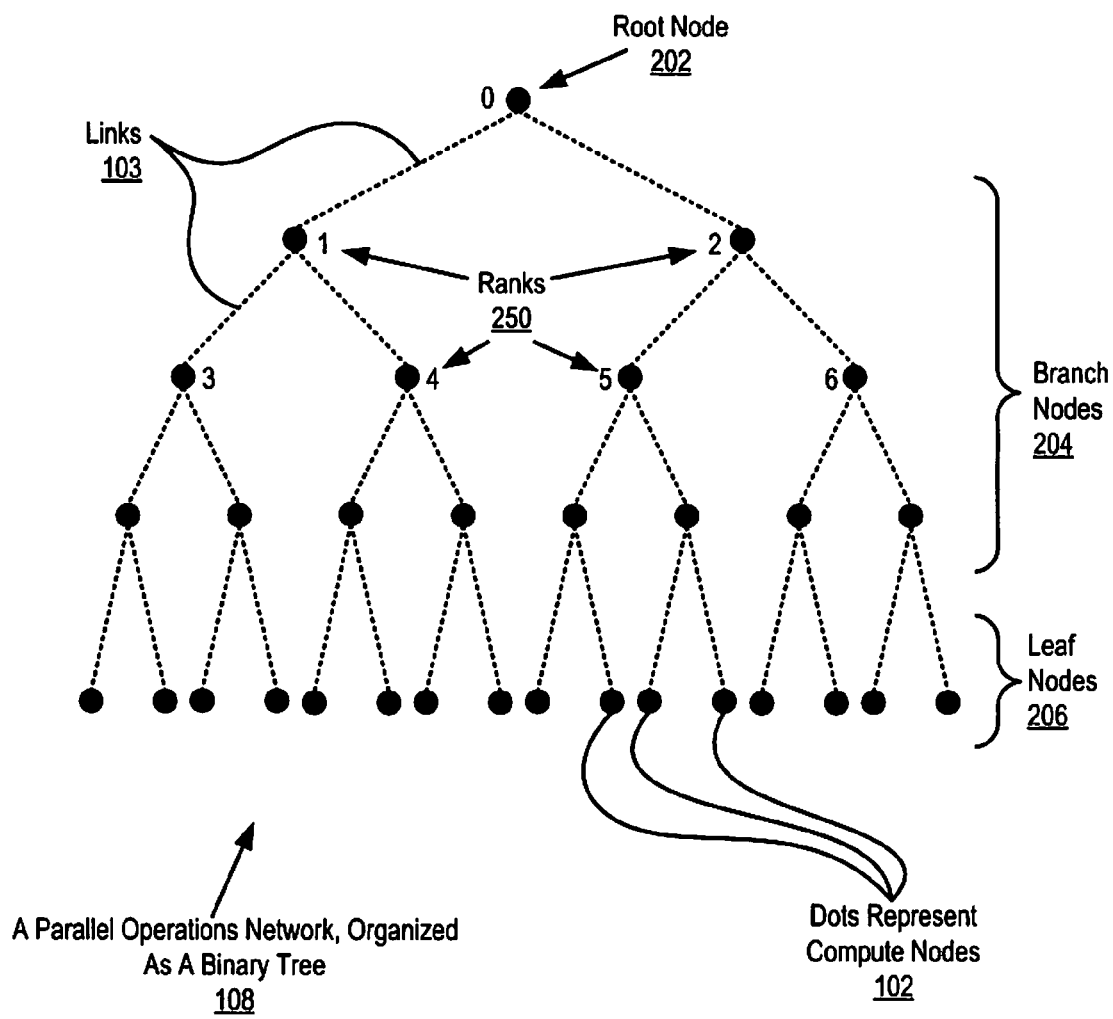
FIG. 5 illustrates an exemplary data communications network optimized for collective operations.

For further explanation, FIG. 5 illustrates an exemplary data communications network (108) optimized for collective operations by organizing compute nodes in a tree. The example data communications network of FIG. 5 includes data communications links connected to the compute nodes so as to organize the compute nodes as a tree. In the example of FIG. 5, dots represent compute nodes (102) of a parallel computer, and the dotted lines (103) between the dots represent data communications links between compute nodes. The data communications links are implemented with collective operations data communications adapters similar to the one illustrated for example in FIG. 3B, with each node typically providing data communications to and from two children nodes and data communications to and from a parent node, with some exceptions. Nodes in a binary tree may be characterized as a root node (202), branch nodes (204), and leaf nodes (206). The root node (202) has two children but no parent. The leaf nodes (206) each has a parent, but leaf nodes have no children. The branch nodes (204) each has both a parent and two children. The links and compute nodes are thereby organized by this data communications network optimized for collective operations into a binary tree (108). For clarity of explanation, the data communications network of FIG. 5 is illustrated with only 31 compute nodes, but readers will recognize that a data communications network optimized for collective operations for use in data communications accordance with embodiments of the present invention may contain only a few compute nodes or may contain thousands of compute nodes.

In the example of FIG. 5, each node in the tree is assigned a unit identifier referred to as a 'rank' (250). A node's rank uniquely identifies the node's location in the tree network for use in both point to point and collective operations in the tree network. The ranks in this example are assigned as integers beginning with 0 assigned to the root node (202), 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

Figure 6:
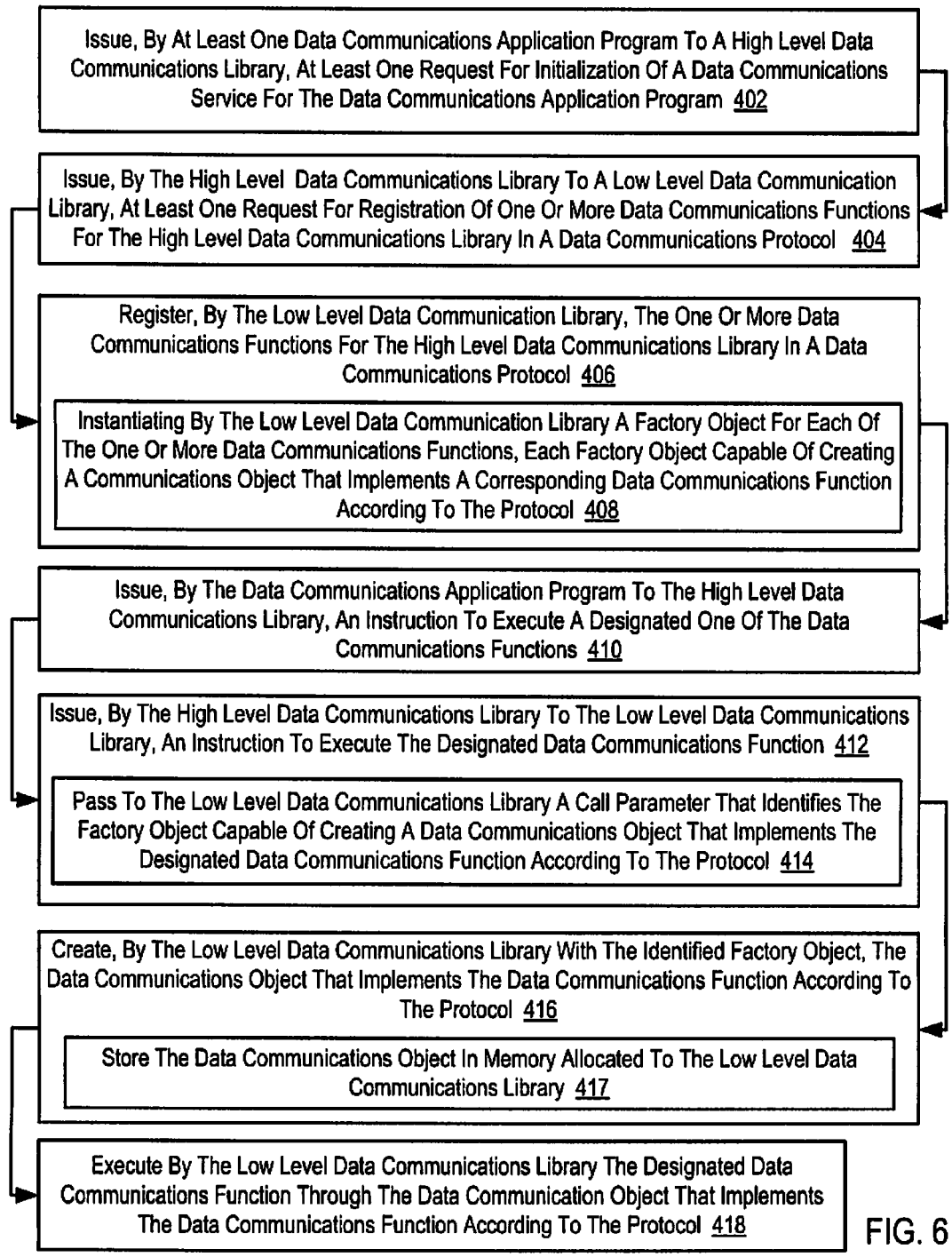
FIG. 6 sets forth a flow chart illustrating an exemplary method of data communications according to embodiments of the present invention.

For further explanation, FIG. 6 sets forth a flow chart illustrating an exemplary method of data communications according to embodiments of the present invention. The method of FIG. 6 is implemented on a computer, the computer having installed upon it at least one application program, at least one high level data communications library, and at least one low level data communication library. The computer may be a parallel computer such as the computers described above in this specification, or the computer may be a more general purpose, sequential computer such as a mainframe, minicomputer, personal computer or a laptop.

The method of FIG. 6 includes issuing (402), by the at least one application program to the high level data communications library, at least one request for initialization of a data communications service for the application program. Issuing such a request may be implemented by a call through an API of the high level data communications library, such as, for example, by the following segments of computer program code:
  errorCode=MPI_init( ); or
  errorCode=ARMCL_init( );

These segments of computer program code are, like all the computer program code in this specification, 'pseudocode,' so-called because the segments are explanations of data processing expressed in the form of code, rather actual working models.

The method of FIG. 6 also includes, responsive to receiving the request for initialization, issuing (404), by the high level data communications library to the low level data communications library, at least one request for registration of one or more data communications functions for the high level data communications library in a data communications protocol. Here are example code segments that illustrate issuing such requests for registration:
  issuing a request for registration of a 'send' data communications function in an MPI protocol optimized for small messages:
    BGML_Send_register (MPI_SMALL_MSG_PROTOCOL, <mpi-specific configuration parameters>)
  issuing a request for registration of a 'send' data communications function in an MPI protocol optimized for large messages:
    BGML_Send_register (MPI_LRG_MSG_PROTOCOL, <mpi-specific configuration>)
  issuing a request for registration of a 'receive' data communications function in an armci protocol optimized for large messages:
    BGML_Receive_register (ARMCI_LRG_MSG_PROTOCOL, <amci-specific configuration>)

The method of FIG. 6 also includes, responsive to receiving the at least one request for registration, registering (406), by the low level data communication library, the one or more data communications functions for the high level data communications library in a data communications protocol. In this example, registering (406) the data communications functions includes instantiating (408) by the low level data communication library a factory object for each of the one or more data communications functions. Each factory object so instantiated is capable of creating a communications object that implements a corresponding data communications function according to the protocol. The low level data communications library, having instantiated the factory object, can return to the high level data communication library a reference to the factory object. Here are several explanatory examples of instantiating a factory object for a data communications function:
  In response to this request for registration of a 'send' data communications function in an MPI protocol optimized for small messages:
    BGML_Send_register (MPI_SMALL_MSG_PROTOCOL, <mpi-specific configuration parameters>),
  instantiate a factory object that can create a 'send' data communications object that implements a 'send' data communications function for an MPI protocol optimized for small messages:
    mpiSendSmallFactoryObject=new (mpiSendFactoryClass)
    SendSmallMessageFactory (<mpi-specific configuration parameters>).
  In response to this request for registration of a 'send' data communications function in an MPI protocol optimized for large messages:
    BGML_Send_register (MPL_LRG_MSG_PROTOCOL, <mpi-specific configuration>),
  instantiate a factory object that can create a 'send' data communications object that implements a 'send' data communications function for an MPI protocol optimized for large messages:
    mpiSendLargeFactoryObject=new (mpiSendFactoryClass) SendLargeMessageFactory (<mpi-specific configuration>).
  In response to this request for registration of a 'receive' data communications function in an armci protocol optimized for large messages:
    BGML_Receive_register (ARMCI_LRG_MSG_PROTOCOL, <armci-specific configuration>),
  instantiate a factory object that can create a 'receive' data communications object that implements a 'receive' data communications function for an ARMCI protocol optimized for large messages:
    armciReceiveLargeFactoryObject=new (annciReceiveFactoryClass) ReceiveLargeMessageFactory (<armci-specific configuration>).

The method of FIG. 6 also includes issuing (410), by the application program to the high level data communications library, an instruction to execute a designated one of the data communications functions. Two explanatory examples:
  an instruction to execute an MPI 'send' data communications function:
    MPI_send( . . . );

an instruction to execute an ARMCI 'receive' data communications function:

ARMCI_receive( . . . );

The method of FIG. 6 also includes, responsive to receiving the instruction from the application program to execute a designated one of the data communications functions, issuing (412), by the high level data communications library to the low level data communications library, an instruction to execute the designated data communications function. In this example, issuing (412) an instruction to execute the designated data communications function includes passing (414) to the low level data communications library a call parameter that identifies the factory object capable of creating a data communications object that implements the designated data communications function according to the protocol. Here are several explanatory examples:

In response to MPI_send( . . . ), issuing the following instruction to execute the designated 'send' data communications function, including passing the call parameter "mpiSendSmallFactoryObject" that identifies the factory object capable of creating a data communications object that implements the designated 'send' data communications function according to an MPI small message protocol:

BGML_Send (mpiSendSmallFactoryObject, . . . ).

In response to MPI_send( . . . ), issuing the following instruction to execute the designated 'send' data communications function, including passing the call parameter "mpiSendLargeFactoryObject" that identifies the factory object capable of creating a data communications object that implements the designated 'send' data communications function according to an MPI large message protocol:

BGML_Send (mpiSendLargeFactoryObject, . . . ).

In response to ARMCI_receive( . . . ), issuing the following instruction to execute the designated 'receive' data communications function, including passing the call parameter "armciReceiveLargeFactoryObject" that identifies the factory object capable of creating a data communications object that implements the designated 'send' data communications function according to an MPI small message protocol:

BGML_Send (armciReceiveLargeFactoryObject, . . . ).

The method of FIG. 6 also includes, responsive to receiving the instruction from the high level data communication library to execute the designated data communications function, creating (416), by the low level data communications library with the identified factory object, the data communications object that implements the data communications function according to the protocol. In the method of FIG. 6, creating (416) the data communications object that implements the data communications function according to the protocol includes storing (417) the data communications object in memory allocated to the low level data communications library. The method of FIG. 6 also includes executing (418) by the low level data communications library the designated data communications function through the data communication object that implements the data communications function according to the protocol.

Each of the following examples illustrates creating (416) the data communications object that implements the data communications function according to the protocol and executing (418) by the low level data communications library the designated data communications function through the data communication object that implements the data communications function according to the protocol. In each of these examples, the data communications object, named 'msg,' is formed directly by computer program code of the low level data communications and is therefore stored in memory allocated to the low level data communications library. In each of these examples, it is the member method named "msg.start( )" that carries out the actual implementation of the data communications function according to the protocol. Here are the examples:

For example, in response to:
BGML_Send (mpiSendSmallFactoryObject, . . . ),
execute:
Message msg=mpiSendSmallFactoryObject->create( );
msg.start( );
For another example, in response to:
BGML_Send (mpiSendLargeFactoryObject, . . . ),
execute:
Message msg=mpiSendLargeFactoryObject->create( );
msg.start( );
For a further example, in response to:
BGML_Send (armciReceiveLargeFactoryObject, . . . ),
execute:
Message msg=ammciReceiveLargeFactoryObject->create( );
msg.start( );

In the method of FIG. 6, both the factory object and the data communications object are stored in computer memory allocated to the low level data communications library. This is non-opaque storage. The low level data communications library is well aware of how its memory is being used. Moreover, requiring the low level data communications library use its own memory allocations for factory objects and data communications objects makes the low level data communications library relatively heavyweight. In many embodiments, it is preferable to have a relatively lightweight low level data communications library.

Figure 7:
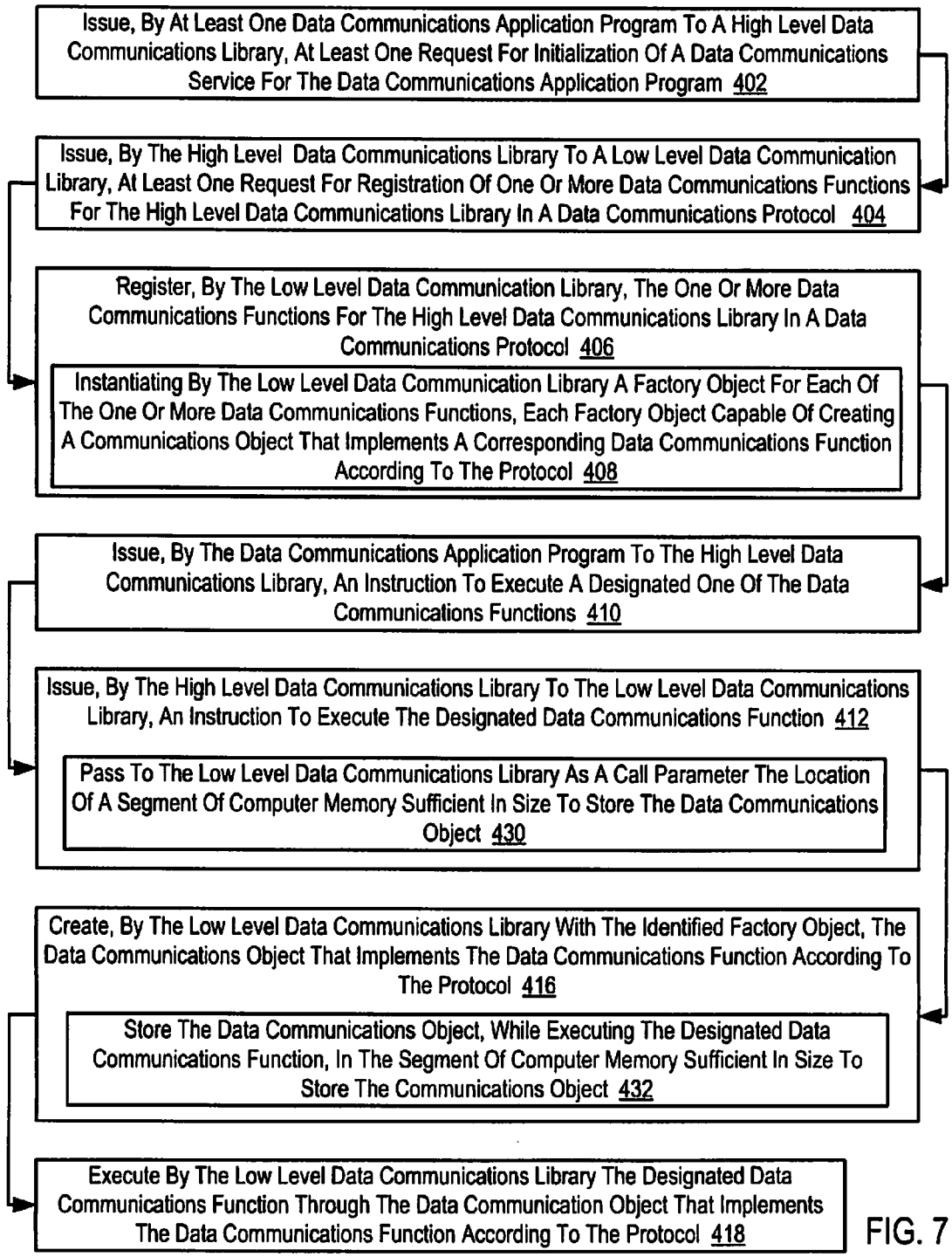
FIG. 7 sets forth a flow chart illustrating a further exemplary method of data communications according to embodiments of the present invention.

For further explanation, FIG. 7 sets forth a flow chart illustrating a further exemplary method of data communications according to embodiments of the present invention. The method of FIG. 7 is similar to the method of FIG. 6, implemented on a computer, and including as it does issuing (402) at least one request for initialization of a data communications service for the application program, issuing (404) at least one request for registration of one or more data communications functions for the high level data communications library in a data communications protocol, registering (406) the one or more data communications functions for the high level data communications library in a data communications protocol, issuing (410) an instruction to execute a designated one of the data communications functions, issuing (412) an instruction to execute the designated data communications function, creating (416) the data communications object that implements the data communications function according to the protocol, executing (418) the designated data communications function through the data communication object—all of which operate in a similar manner as described above with regard to the method of FIG. 6.

In the method of FIG. 7, however, unlike the method of FIG. 6, issuing (412), by the high level data communications library to the low level data communications library, an instruction to execute the designated data communications function includes passing (430) to the low level data communications library as a call parameter the location of a segment of computer memory sufficient in size to store the data communications object. This segment of computer memory is random access memory allocated to the high level data communications library. This segment of computer memory is viewed in effect from the point of view of the high level data communications library as an opaque data type, 'opaque' because it has no semantics within the high level data communications library. The high level data communications library itself makes no use of this segment of computer memory and in fact never has any knowledge whatsoever of what it is used for. Here is an example of an instruction to execute a designated data communications function that includes as a call parameter, "&msg," the location of a segment of computer memory sufficient in size to store the data communications object:

BGML_Send (mpiSendSmallFactoryObject, &msg, callback, . . . );

Another difference between the methods of FIGS. 6 and 7 is that, in the method of FIG. 7, creating (416) the data communications object includes storing (432) the data communications object, while executing the designated data communications function, in the segment of computer memory sufficient in size to store the data communications object. For example, in response to:

BGML_Send (mpiSendSmallFactoryObject, &msg, callback, . . . ), create the data communications object, named "msg," and store the data communications object, while executing the designated data communications function, in the segment of computer memory sufficient in size to store the communications object:

(Message) msg=mpiSendSmallFactoryObject->generate( ); msg.start( );

Msg.start( ) executes the designated data communications function through the data communications object named "msg." The cast (Message) effectively stores the "msg" data communications object in the segment of segment of computer memory, allocated to the high level data communications program and designated "&msg" in the BGML_send( ) call, sufficient in size to store the data communications object. In this example, the BGML_send( ) call is non-blocking. It therefore includes a "callback" registration. After the low level data communications library executes the designated data communications function, the low level data communications library calls the callback function to notify the calling program in the high level data communications library of completion of the designated data communications function—after which the calling program is free to release the opaque memory in which the communications object was stored.

Figure 8:
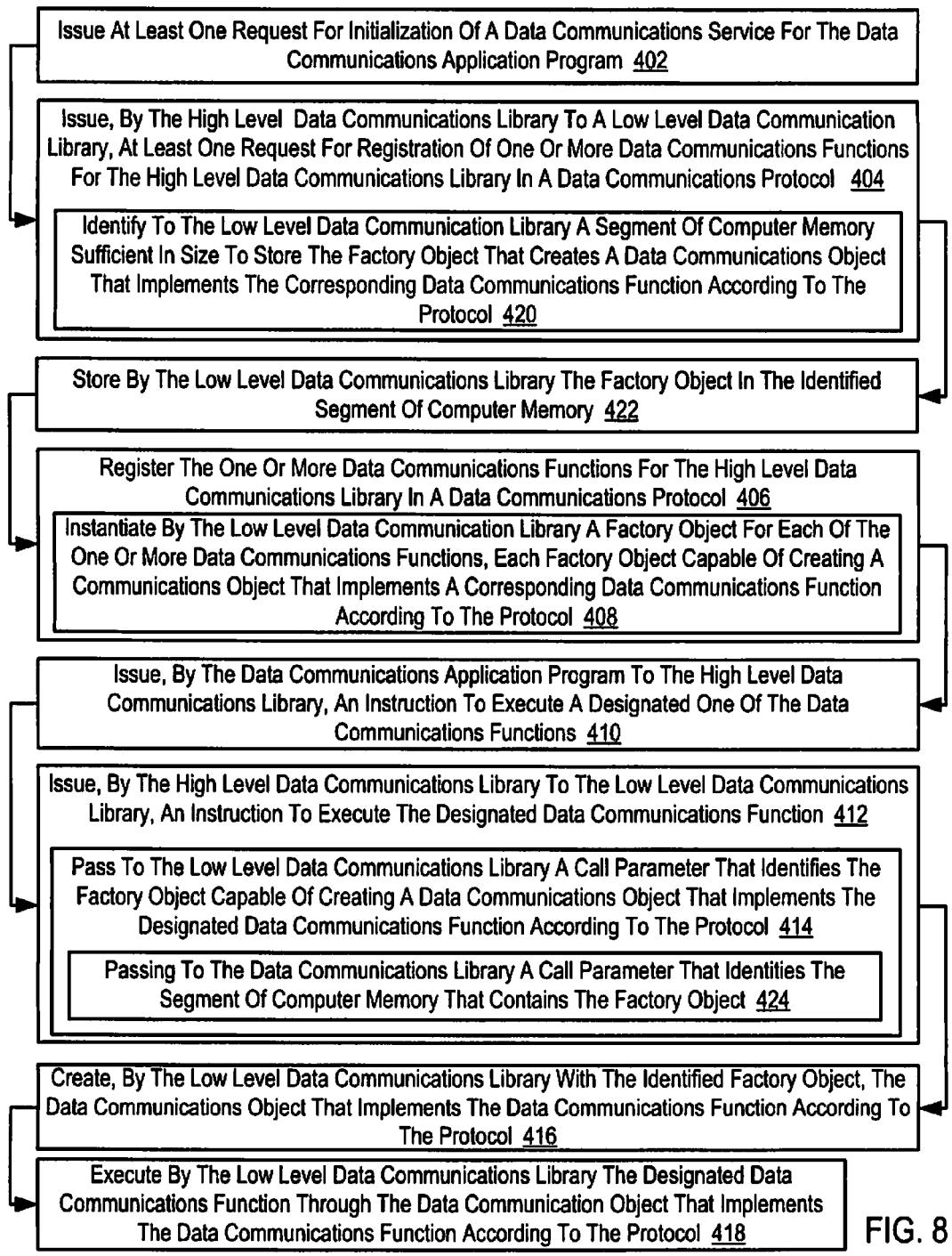
FIG. 8 sets forth a flow chart illustrating a further exemplary method of data communications according to embodiments of the present invention.

For further explanation, FIG. 8 sets forth a flow chart illustrating a further exemplary method of data communications according to embodiments of the present invention. The method of FIG. 8 is similar to the method of FIG. 6, implemented on a computer, and including as it does issuing (402) at least one request for initialization of a data communications service for the application program, issuing (404) at least one request for registration of one or more data communications functions for the high level data communications library in a data communications protocol, registering (406) the one or more data communications functions for the high level data communications library in a data communications protocol, issuing (410) an instruction to execute a designated one of the data communications functions, issuing (412) an instruction to execute the designated data communications function, creating (416) the data communications object that implements the data communications function according to the protocol, executing (418) the designated data communications function through the data communication object—all of which operate in a similar manner as described above with regard to the method of FIG. 6.

Claim 4 is the Opaque Mode, Factory Storage in the Calling Layer:

In the method of FIG. 8, however, unlike the method of FIG. 6, issuing (404) at least one request for registration of one or more data communications functions includes identifying (420) to the low level data communication library a segment of computer memory sufficient in size to store the factory object that creates a data communications object that implements the corresponding data communications function according to the protocol. This segment of computer memory is random access memory allocated to the high level data communications library. This segment of computer memory is viewed in effect from the point of view of the high level data communications library as an opaque data type, 'opaque' because it has no semantics within the high level data communications library. The high level data communications library itself makes no use of this segment of computer memory and in fact never has any knowledge whatsoever of what it is used for. Here is an example of issuing (404) a request for registration of a data communications functions that includes identification, "&opaque_type_mpi_small," of a segment of computer memory sufficient in size to store the factory object:

BGML_Send_register (&opaque_type_mpi_small, MPI_SMALL_MESSAGE_PROTOCOL, <mpi-specific configuration>).

The method of FIG. 8, unlike the method of FIG. 6, includes storing (422), by the low level data communications library, the factory object in the identified segment of computer memory. Storing (422) the factory object in the identified segment of computer memory can be carried out as shown here:

new (opaque_type_mpi_small) SendSmallMessageFactory (<mpi-specific configuration>), where the cast (opaque_type_mpi_small) stores the new factory object in the segment of computer memory allocated to the high level data communications library and identified by "&opaque_type_mpi_small."

Another difference between the methods of FIGS. 6 and 8 is that, in the method of FIG. 8, passing (414) to the data communications library a call parameter that identifies the factory object includes passing (424) to the data communications library a call parameter that identifies the segment of computer memory that contains the factory object, as in, for example:

BGML_Send (&opaque_type_mpi_small, callback, . . . ), where the address of the opaque data type, "&opaque_ype_mpi_small," is a call parameter that identifies the segment of computer memory that contains the factory object. In this example, the BGML_send( ) call is non-blocking. It therefore includes a "callback" registration. After the low level data communications library executes the designated data communications function, the low level data communications library calls the callback function to notify the calling program in the high level data communications library of completion of the designated data communications function—after which the calling program is free to release the opaque memory in which the factory object was stored.

In the example of FIG. 8, creating (416) the data communications object that implements the data communications function and executing (418) the designated data communications function can be carried out by:

SendMessageFactory*factory=(SendMessageFactory*) opaque_type_mpi_small;
 Message msg=factory->create( );
 msg.start( );

The factory object is already instantiated and stored at opaque_type_mpi_small, so (SendMessageFactory*) casts the contents of opaque_type_mpi_small as a SendMessageFactory and assigns the value of the address to "factory." The factory->create( ) method instantiates the data communications object named "msg," and the msg.start( ) method executes the designated data communications function through the data communications object named "msg."

Figure 9:
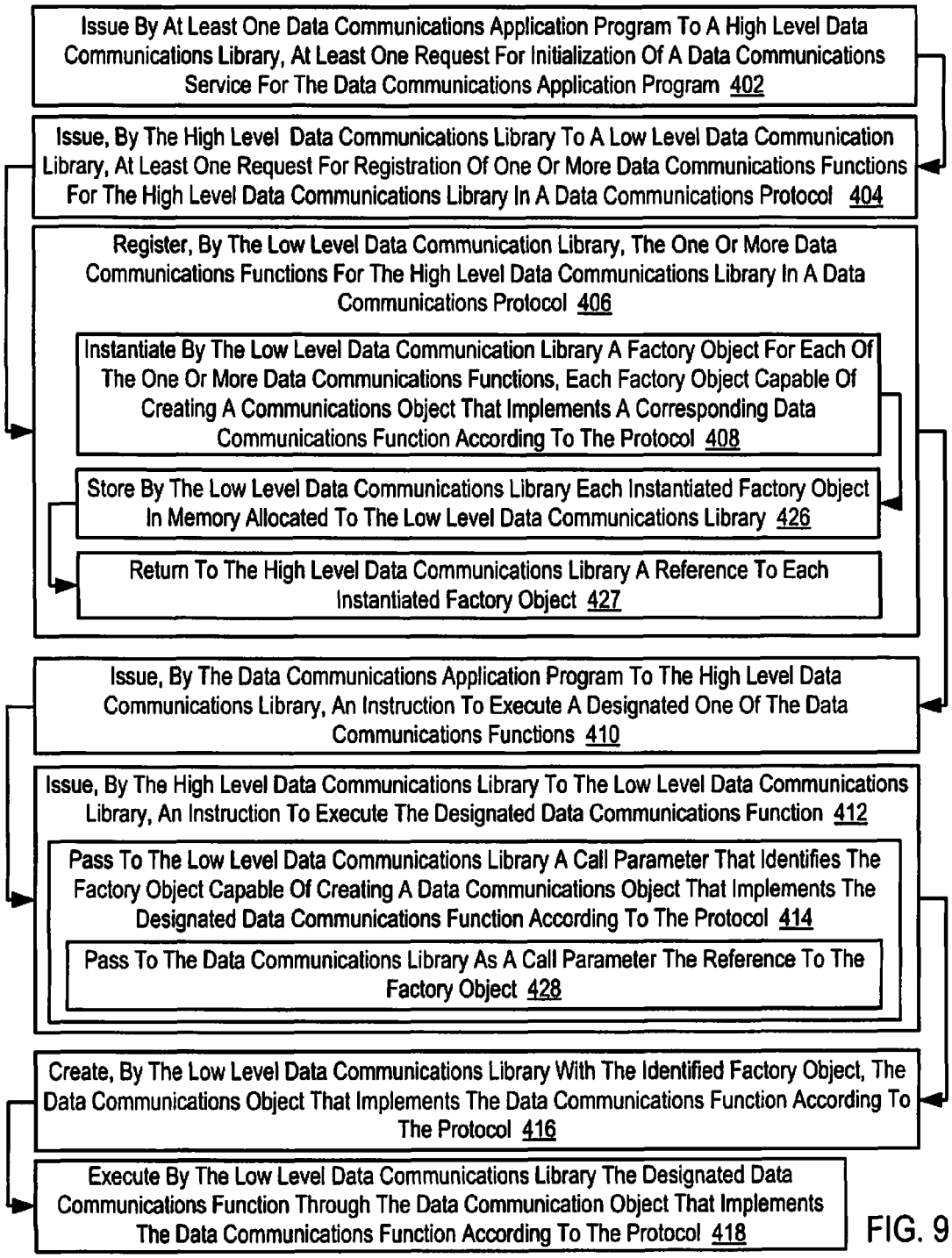
FIG. 9 sets forth a flow chart illustrating a further exemplary method of data communications according to embodiments of the present invention.

For further explanation, FIG. 9 sets forth a flow chart illustrating a further exemplary method of data communications according to embodiments of the present invention. The method of FIG. 9 is similar to the method of FIG. 6, implemented on a computer, and including as it does issuing (402) at least one request for initialization of a data communications service for the application program, issuing (404) at least one request for registration of one or more data communications functions for the high level data communications library in a data communications protocol, registering (406) the one or more data communications functions for the high level data communications library in a data communications protocol, issuing (410) an instruction to execute a designated one of the data communications functions, issuing (412) an instruction to execute the designated data communications function, creating (416) the data communications object that implements the data communications function according to the protocol, executing (418) the designated data communications function through the data communication object—all of which operate in a similar manner as described above with regard to the method of FIG. 6.

In the method of FIG. 9, however, unlike the method of FIG. 6, registering (406), by the low level data communication library, the one or more data communications functions includes storing (426) by the low level data communications library each instantiated factory object in memory allocated to the low level data communications library and returning (427) to the high level data communications library a reference to each instantiated factory object. The low level data communications library, having instantiated the factory object, can return to the high level data communication library a reference to the factory object. In response to this request for registration of a 'send' data communications function in an MPI protocol optimized for small messages, for example:

BGML_Send_register (MPI_SMALL_MSG_PROTO-
       COL, <mpi-specific configuration parameters>), the low level data communications library can instantiate a factory object that can create a 'send' data communications object that implements a 'send' data communications function for an MPI protocol optimized for small messages like this, for example:

mpiSendSmallFactoryObject=new (mpiSendFactoryClass) SendSmallMessageFactory (<mpi-specific configuration parameters>).

Then, having instantiated the factory object, the low level data communications library, can return to the high level data communication library this reference to the factory object: mpiSendSmallFactoryObject.

Another difference between the methods of FIGS. 6 and 9 is that, in the method of FIG. 9, passing (414) to the low level data communications library a call parameter that identifies the factory object includes passing (428) to the data communications library as a call parameter the reference to the factory object with an API call similar to this one, for example:

BGML_Send (mpiSendSmallFactoryObject, . . . ), for a blocking call, or this:

BGML_Send (mpiSendSmallFactoryObject, callback, . . . ), for a non-blocking with a callback function to report to the high level data communications library completion of execution of the designated data communications function.

In view of the explanations set forth above in this specification, readers will recognize that the benefits of carrying data communications according to embodiments of the present invention include the following:

- The present invention includes no limitation regarding the number of high level data communications libraries with concurrent access to a low level data communications library. Multiple applications programs can use multiple high level data communications libraries at the same time. An application program on a computer with a particular low level data communication library can use data communications services from an MPI library, an ARMCI library, a PVM library, and TCGMSG library, all at the same time.
- Data communications according to the present invention uses a single standard API for each high level data communications library, MPI, PVM, ARMCI, and so on, with no need for new or unique interfaces when adding new protocols through a low level data communications library.
- Data communications according to the present invention provides high level data communications libraries access to all data communications protocols on a system, through the low level data communications library.
- Data communications according to the present invention provides for extension and optimization of data communications protocols such as, for example, creating a new "small_message" protocol implementation for the BGML_Send( ) API.
- Any number of low level protocols can be associated with high level APIs in relations between low level data communications libraries and high level data communications libraries.
- Systems that effect data communications according to embodiments of the present invention can register different configurations for protocol implementation interfaces, blocking calls, non-blocking calls with callbacks, various provisions of client data, returns of references to factory objects, and so on.
- Systems that effect data communications according to embodiments of the present invention are scalable, not by adding more routines or more hardware, but by adding any number of high level data communications libraries on top of a low level data communications library implemented according to the present invention. Each high level library can make exactly the same registration call and exactly the same operational calls, all with exactly the same call signatures, same parameters, different values of course, but same parameters, and receive a wide variety of data communications services over various protocols simply by making the exact same registration and service calls. Protocol support is expanded simply by adding a new protocol identifier, adding a new data communications class for each message type in the new protocol, send, get, and so on, and adding a new factory class for each new data communications class.

Exemplary embodiments of the present invention are described in this specification largely in the context of a parallel computer, appropriate because many parallel computers have intensive data communications requirements. Readers of skill in the art will recognize, however, that the present invention also may be implemented in any computer, parallel, sequential, SIMD, MIMD, Von Neumann architectures, Harvard architecture, and so on.

Exemplary embodiments of the present invention are described in this specification largely in the context of a fully functional computer system for data communications. Readers of skill in the art will recognize, however, that the present invention also may be embodied in a computer program product disposed on computer readable, signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernet based networks and networks that communicate with the Internet Protocol and the World Wide Web.

Persons skilled in the art will immediately recognize that any computer system having suitable programming means will be capable of executing methods of the invention as embodied in a computer program products. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A computer-implemented method of data communications, the computer comprising at least one application program, at least one high level data communications library, and at least one low level data communication library, the method comprising:

issuing, by the at least one application program to the high level data communications library, at least one request for initialization of a data communications service for the application program;

responsive to receiving the request for initialization, issuing, by the high level data communications library to the low level data communications library, at least one request for registration of one or more data communications functions for the high level data communications library in a data communications protocol;

responsive to receiving the at least one request for registration, registering, by the low level data communication library, the one or more data communications functions for the high level data communications library in a data communications protocol, including instantiating by the low level data communication library a factory object for each of the one or more data communications functions, each factory object capable of creating a communications object that implements a corresponding data communications function according to the protocol;

issuing, by the application program to the high level data communications library, an instruction to execute a designated one of the data communications functions;

responsive to receiving the instruction from the application program, issuing, by the high level data communications library to the low level data communications library, an instruction to execute the designated data communications function, including passing to the low level data communications library a call parameter that identifies the factory object capable of creating a data communications object that implements the designated data communications function according to the protocol;

responsive to receiving the instruction from the high level data communication library, creating, by the low level data communications library with the identified factory object, the data communications object that implements the data communications function according to the protocol; and executing by the low level data communications library the designated data communications function through the data communication object that implements the data communications function according to the protocol.

2. The method of claim 1 wherein creating the communications object further comprises storing the data communications object in memory allocated to the low level data communications library.

3. The method of claim 1 wherein:

issuing, by the high level data communications library to the low level data communications library, an instruction to execute the designated data communications function further comprises passing to the low level data communications library as a call parameter the location of a segment of computer memory sufficient in size to store the data communications object; and creating the data communications object further comprises storing the data communications object, while executing the designated data communications function, in the segment of computer memory sufficient in size to store the data communications object.

4. The method of claim 1 wherein:

issuing at least one request for registration of one or more data communications functions further comprises identifying to the low level data communication library a segment of computer memory sufficient in size to store the factory object that creates a data communications object that implements the corresponding data communications function according to the protocol;

the method further comprises storing by the low level data communications library the factory object in the identified segment of computer memory; and passing to the data communications library a call parameter that identifies the factory object further comprises passing to the data communications library a call parameter that identifies the segment of computer memory that contains the factory object.

5. The method of claim 1 wherein:

registering, by the low level data communication library, the one or more data communications functions further comprises storing by the low level data communications library each instantiated factory object in memory allocated to the low level data communications library and returning to the high level data communications library a reference to each instantiated factory object; and passing to the data communications library a call parameter that identifies the factory object further comprises passing to the low level data communications library as a call parameter the reference to the factory object.

6. Apparatus for data communications, the apparatus comprising at least one application program, at least one high level data communications library, and at least one low level data communication library, the apparatus further comprising a computer processor, a computer memory operatively coupled to the computer processor, the computer memory having disposed within it computer program instructions capable of:

issuing, by the at least one application program to the high level data communications library, at least one request for initialization of a data communications service for the application program;

responsive to receiving the request for initialization, issuing, by the high level data communications library to the low level data communications library, at least one request for registration of one or more data communications functions for the high level data communications library in a data communications protocol;

responsive to receiving the at least one request for registration, registering, by the low level data communication library, the one or more data communications functions for the high level data communications library in a data communications protocol, including instantiating by the low level data communication library a factory object for each of the one or more data communications functions, each factory object capable of creating a communications object that implements a corresponding data communications function according to the protocol;

issuing, by the application program to the high level data communications library, an instruction to execute a designated one of the data communications functions;

responsive to receiving the instruction from the application program, issuing, by the high level data communications library to the low level data communications library, an instruction to execute the designated data communications function, including passing to the low level data communications library a call parameter that identifies the factory object capable of creating a data communications object that implements the designated data communications function according to the protocol;

responsive to receiving the instruction from the high level data communication library, creating, by the low level data communications library with the identified factory object, the data communications object that implements the data communications function according to the protocol; and executing by the low level data communications library the designated data communications function through the data communication object that implements the data communications function according to the protocol.

7. The apparatus of claim 6 wherein creating the communications object further comprises storing the data communications object in memory allocated to the low level data communications library.

8. The apparatus of claim 6 wherein:

issuing, by the high level data communications library to the low level data communications library, an instruction to execute the designated data communications function further comprises passing to the low level data communications library as a call parameter the location of a segment of computer memory sufficient in size to store the data communications object; and creating the data communications object further comprises storing the data communications object, while executing the designated data communications function, in the segment of computer memory sufficient in size to store the data communications object.

9. The apparatus of claim 6 wherein:

issuing at least one request for registration of one or more data communications functions further comprises identifying to the low level data communication library a segment of computer memory sufficient in size to store the factory object that creates a data communications object that implements the corresponding data communications function according to the protocol;

the apparatus further comprises computer program instructions capable of storing by the low level data communications library the factory object in the identified segment of computer memory; and passing to the data communications library a call parameter that identifies the factory object further comprises passing to the data communications library a call parameter that identifies the segment of computer memory that contains the factory object.

10. The apparatus of claim 6 wherein:

registering, by the low level data communication library, the one or more data communications functions further comprises storing by the low level data communications library each instantiated factory object in memory allocated to the low level data communications library and returning to the high level data communications library a reference to each instantiated factory object; and passing to the data communications library a call parameter that identifies the factory object further comprises passing to the low level data communications library as a call parameter the reference to the factory object.

11. A computer program product for data communications, the computer program product disposed in a computer-readable, recordable medium, the computer program product comprising computer program instructions capable of:

issuing, by at least one application program to a high level data communications library, at least one request for initialization of a data communications service for the application program;

responsive to receiving the request for initialization, issuing, by the high level data communications library to a low level data communications library, at least one request for registration of one or more data communications functions for the high level data communications library in a data communications protocol;

responsive to receiving the at least one request for registration, registering, by the low level data communication library, the one or more data communications functions for the high level data communications library in a data communications protocol, including instantiating by the low level data communication library a factory object for each of the one or more data communications functions, each factory object capable of creating a communications object that implements a corresponding data communications function according to the protocol;

issuing, by the application program to the high level data communications library, an instruction to execute a designated one of the data communications functions;

responsive to receiving the instruction from the application program, issuing, by the high level data communications library to the low level data communications library, an instruction to execute the designated data communications function, including passing to the low level data communications library a call parameter that identifies the factory object capable of creating a data communications object that implements the designated data communications function according to the protocol;

responsive to receiving the instruction from the high level data communication library, creating, by the low level data communications library with the identified factory object, the data communications object that implements the data communications function according to the protocol; and executing by the low level data communications library the designated data communications function through the data communication object that implements the data communications function according to the protocol.

12. The computer program product of claim 11 wherein creating the communications object further comprises storing the data communications object in memory allocated to the low level data communications library.

13. The computer program product of claim 11 wherein:
issuing, by the high level data communications library to the low level data communications library, an instruction to execute the designated data communications function further comprises passing to the low level data communications library as a call parameter the location of a segment of computer memory sufficient in size to store the data communications object; and
creating the data communications object further comprises storing the data communications object, while executing the designated data communications function, in the segment of computer memory sufficient in size to store the data communications object.

14. The computer program product of claim 11 wherein:
issuing at least one request for registration of one or more data communications functions further comprises identifying to the low level data communication library a segment of computer memory sufficient in size to store the factory object that creates a data communications object that implements the corresponding data communications function according to the protocol;
the computer program product further comprises computer program instructions capable of storing by the low level data communications library the factory object in the identified segment of computer memory; and
passing to the data communications library a call parameter that identifies the factory object further comprises passing to the data communications library a call parameter that identifies the segment of computer memory that contains the factory object.

15. The computer program product of claim 11 wherein:
registering, by the low level data communication library, the one or more data communications functions further comprises storing by the low level data communications library each instantiated factory object in memory allocated to the low level data communications library and returning to the high level data communications library a reference to each instantiated factory object; and
passing to the data communications library a call parameter that identifies the factory object further comprises passing to the low level data communications library as a call parameter the reference to the factory object.

* * * * *